(12) United States Patent
Cole et al.

(10) Patent No.: US 6,817,722 B1
(45) Date of Patent: Nov. 16, 2004

(54) METHOD AND SYSTEM FOR REDUCING MOIRÉ IN DISPLAYS

(75) Inventors: James R Cole, Albany, OR (US); William J. Allen, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/672,993

(22) Filed: Sep. 25, 2003

(51) Int. Cl.[7] .................. G03B 21/14; G03B 21/22; G03B 21/00
(52) U.S. Cl. ............... 353/69; 353/74; 353/32; 353/122
(58) Field of Search .............. 353/30–33, 37, 353/69, 46, 50, 74–80, 101, 121, 122, 70; 359/455–457, 460, 554–557, 196, 197, 205, 209–211, 212–215; 348/771, 778–785, 806, 807, 787; 349/5, 7

(56) References Cited

U.S. PATENT DOCUMENTS

| 5,825,541 | A | * | 10/1998 | Imai | 359/464 |
| 6,384,980 | B1 | * | 5/2002 | McKinley | 359/619 |
| 6,732,641 | B2 | * | 5/2004 | Fissell | 101/128.4 |
| 2002/0118452 | A1 | * | 8/2002 | Taniguchi et al. | 359/463 |
| 2004/0041747 | A1 | * | 3/2004 | Uehara et al. | 345/6 |

* cited by examiner

Primary Examiner—Judy Nguyen
Assistant Examiner—Andrew Sever

(57) ABSTRACT

A system for a reduced moiré display has a lenticular screen, a projector, and means for disturbing at least a portion of the projector to cause displacement of the projection of pixels on the screen to reduce moiré. A method for reducing moiré projects a plurality of pixels onto a lenticular screen and disturbs the projector to cause displacement of the projection of pixels to reduce moiré.

48 Claims, 3 Drawing Sheets

METHOD AND SYSTEM FOR REDUCING MOIRÉ IN DISPLAYS

FIELD OF THE INVENTION

This invention relates in general to projection displays and more particularly to reducing moiré in projection displays.

BACKGROUND OF THE INVENTION

Conventional lenticular projection displays often suffer from moiré. Moiré results from the improper alignment of the periodical structures with the pixel projection pitch. When a linear space between pixels aligns with a row or column of lenticular lenses on the screen, the result is moiré. Moiré appears to the viewer as bands across the display.

Conventionally, moiré is addressed by making the pitch of the lenticular lenses finer than the image pixel pitch. However, the main drawback to this conventional solution is expense. As displays become higher resolution, the lenticular lenses must become increasingly small. Lenticular screens typically become considerably more expensive and difficult to manufacture as the size of the lenticular lenses decrease.

SUMMARY OF THE INVENTION

According to principles of the present invention, In one embodiment, moiré is reduced on a lenticular screen. A projector is configured to project pixels onto the screen for display. At least a portion of the projector is disturbed to cause displacement of the projection of the pixels to reduce moiré.

DETAILED DESCRIPTION OF THE INVENTION

Figure 1:
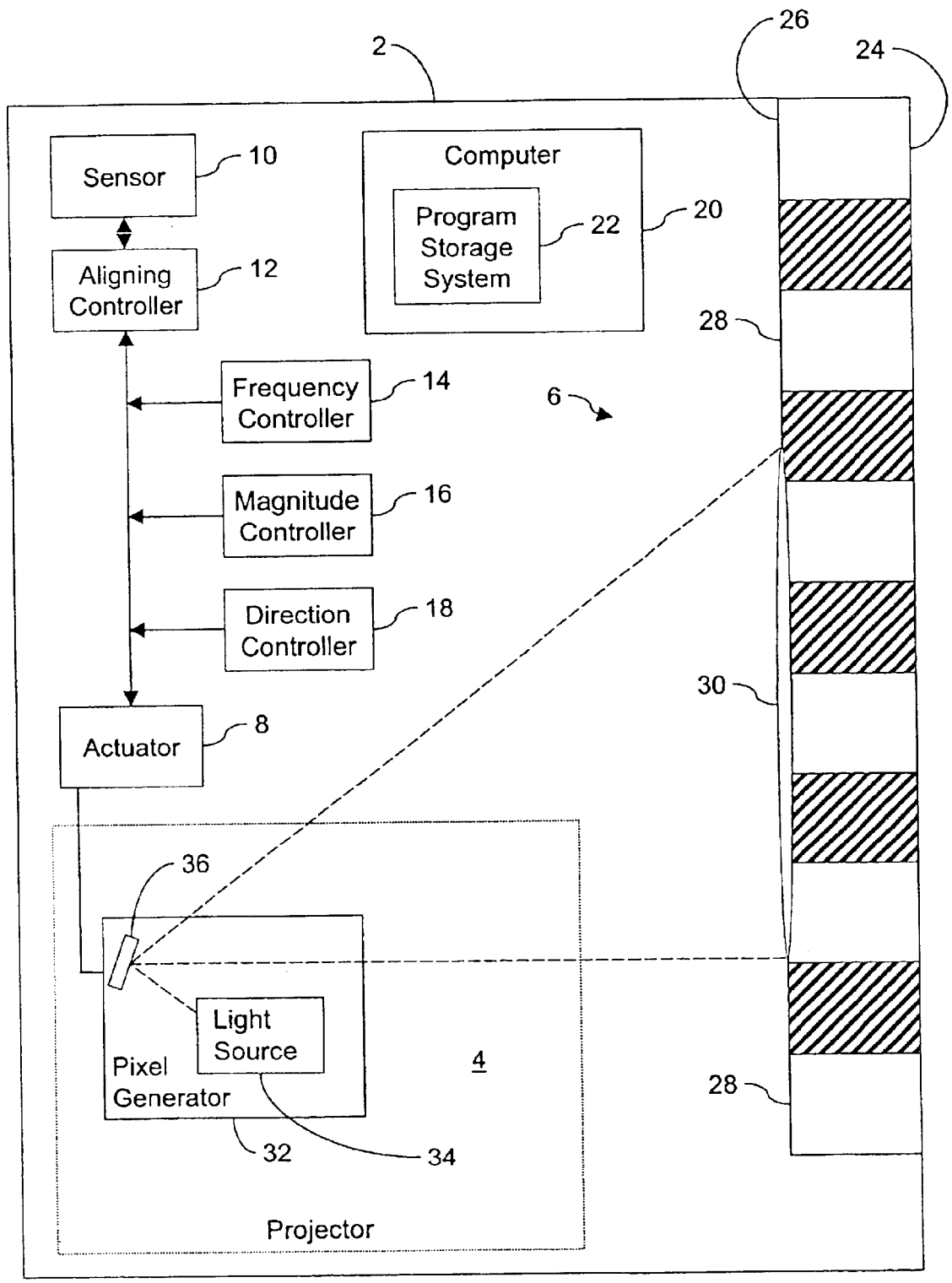
FIG. 1 is a cross sectional illustration of one embodiment of the present invention reduced moiré display.

Illustrated in FIG. 1 is one embodiment of the reduced moiré display 2 of the present invention. Display 2 includes projector 4, screen 6, actuator 8 and optionally, sensor 10, pixel projection pitch controller 12, frequency controller 14, magnitude controller 16, direction controller 18, computer 20, and program storage system 22.

Lenticular screen 6 has front 24 and back 26. Lenticular screen 6 includes lenticules 28. In one embodiment, lenticules 28 are tiny grooves molded or embossed into the surface of lenticular screen 6. Lenticules 28 serve as lenses to pass light from back 26 of screen 6 to front 24 of screen 6.

Figure 2:
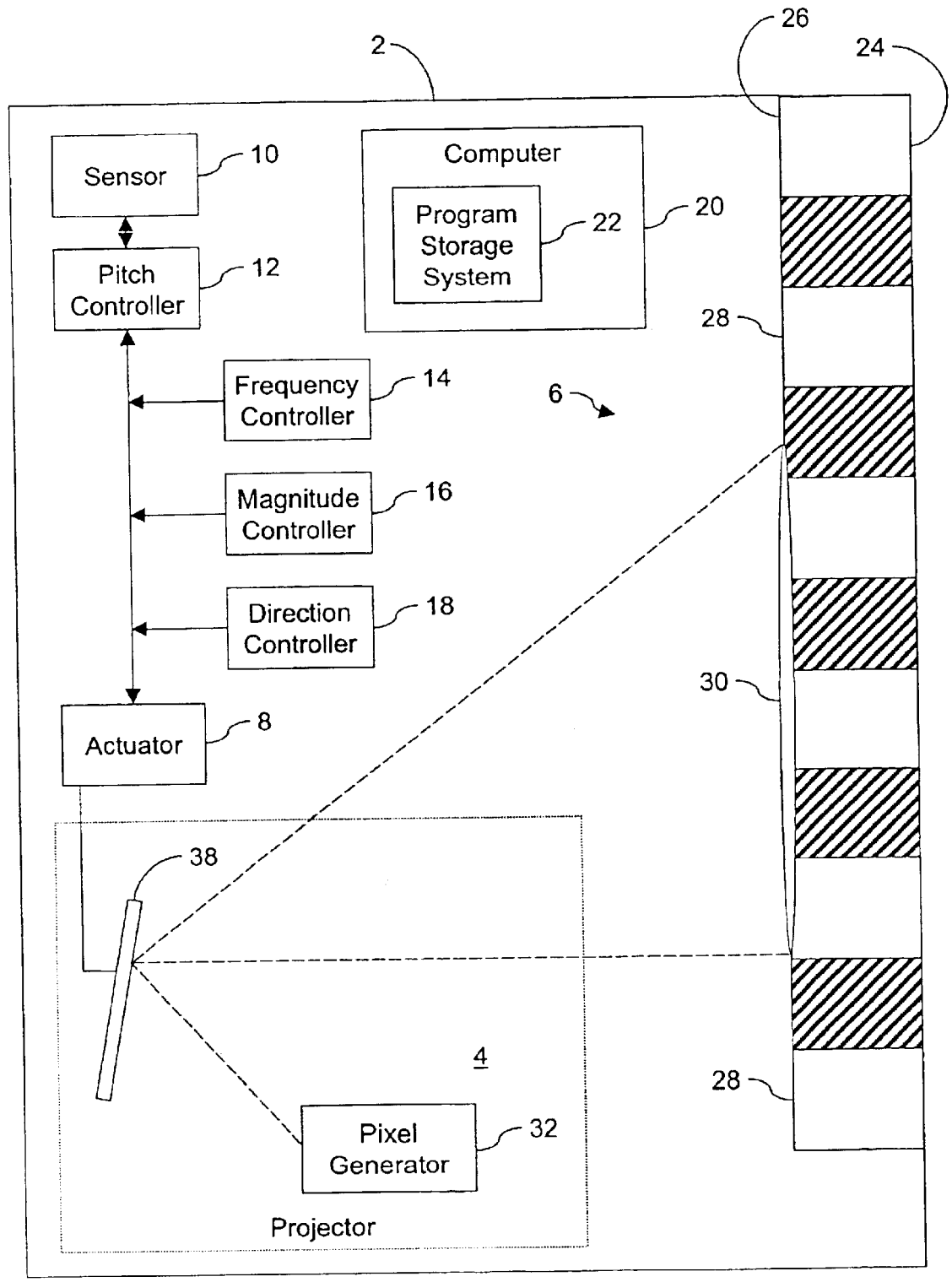
FIG. 2 is a cross sectional illustration of another embodiment of the present invention reduced moiré display.

Although FIGS. 1 and 2 illustrate a rear projection display system, other forms of projection display systems, such as a front projection display, can be substituted without departing from the present invention. In a front projection display, screen front 24 and back 26 are interchanged in the Figures. In this embodiment, lenticules 28 serve as lenses that reflect light.

Projector 4 is any structure configured to project pixel 30 onto screen 6. In one embodiment, projector 4 is configured to project pixel 30 onto only one lenticule 28. In another embodiment, projector 4 projects pixel 30 onto several lenticules 28.

Projector 4 includes pixel generator 32. Pixel generator 32 is any structure configured to generate pixels 30 for projection by projector 4 onto screen 6.

In one embodiment, pixel generator 32 includes light source 34 and micro-mirror 36. Light source 34 is any source of light. In one embodiment, light source 34 is a source of a single color of light. In another embodiment, light source 34 is a source of multiple colors of light, such as red, blue, and green.

Micro-mirror 36 is any structure configured to direct pixel 30 onto screen 6 directly or to direct pixel 30 onto positioning mirror 38 (see FIG. 2) for indirect projection onto screen 6. Although FIG. 1 illustrates only one micro-mirror 36, in practice, pixel generator 32 usually includes more than one micro-mirror 36. In this embodiment, micro-mirrors 36 may be configured in any manner suitable for directing pixels 30 onto screen 6. An example of one such configuration is an array.

Optionally, projector 4 also includes positioning mirror 38. As illustrated in FIG. 2, pixel generator 32 conveys pixel 30 of light onto positioning mirror 38. Positioning mirror 38 directs pixel 30 onto at least one lenticule 28.

Actuator 8 is any structure configured to cause physical displacement of the projection of pixel 30 on screen 6 to reduce moiré. Moiré is reduced by either aligning each pixel 30 with lenticules 28 or repetitively displacing each pixel 30 so that moiré is less visible or less noticeable to the viewer.

Examples of actuator 8 include vibrators, rotators, modulators, and translators. In one embodiment, actuator 8 includes a vibrator linked to at least one of the micro-mirrors 36. In another embodiment, actuator 8 a vibrator linked to positioning mirror 38.

Sensor 10 is any structure configured to determine the location of the projection of pixel 30 in order to align the projection with lenticule 28.

Pixel projection pitch controller 12 is any combination of hardware and executable code configured to receive status information from sensor 10 regarding the location of the projection of pixel 30 relative to the location of lenticule 28. Pixel projection pitch controller 12 is also configured to respond to the status information by directing actuator 8 to displace pixel 30 from its present projected location to the location that aligns the pixel pitch projection with the pitch of lenticule 28.

Frequency controller 14 is any combination of hardware and executable code configured to regulate actuator 8 to regulate the frequency of the displacement. In one embodiment, the frequency is a frequency higher than may be noticed by a human eye.

Magnitude controller 16 is any combination of hardware and executable code configured to regulate actuator 8 to regulate the magnitude of the disturbance to cause a particular amount or distance of displacement. The displacement of the projection of pixel 30 is any degree of displacement. In one embodiment, the projection of pixel 30 is displaced the distance of the size of less than one lenticule 28. In another embodiment, the projection of pixel 30 is displaced the distance of the size of less than one pixel 30.

Direction controller 18 is any combination of hardware and executable code configured to regulate actuator 8 to regulate the direction of the displacement caused by the disturbance. In one embodiment, the displacement caused by the disturbance always moves pixel 30 from its usual projection location to another established projection location. In another embodiment, the direction of the displacement caused by the disturbance is regulated to cause pixel 30 to project in different locations each time projector 4 is disturbed.

Each of the magnitude, frequency, and direction may be repetitive or irregular. Examples of repetitive movement are linear, circular, and sinusoidal movement. Examples of irregular movement include random, pseudorandom, and complex functional movement. Complex functional movement is movement controlled by a complex function.

Computer 20 is any combination of hardware and executable code configured to execute executable code stored in program storage system 22. Although pictured and discussed as separate from computer 20, projector 4, pixel projection pitch controller 12, frequency controller 14, magnitude controller 16, and direction controller 18 are alternatively integral with or have portions integral with computer 20.

Program storage system 22 is any device or system configured to store data or executable code. Program storage system 22 may also be a program storage system tangibly embodying a program, applet, or instructions executable by computer 20 for performing the method steps of the present invention executable by computer 20. Program storage system 22 may be any type of storage media such as magnetic, optical, or electronic storage media.

Figure 3:
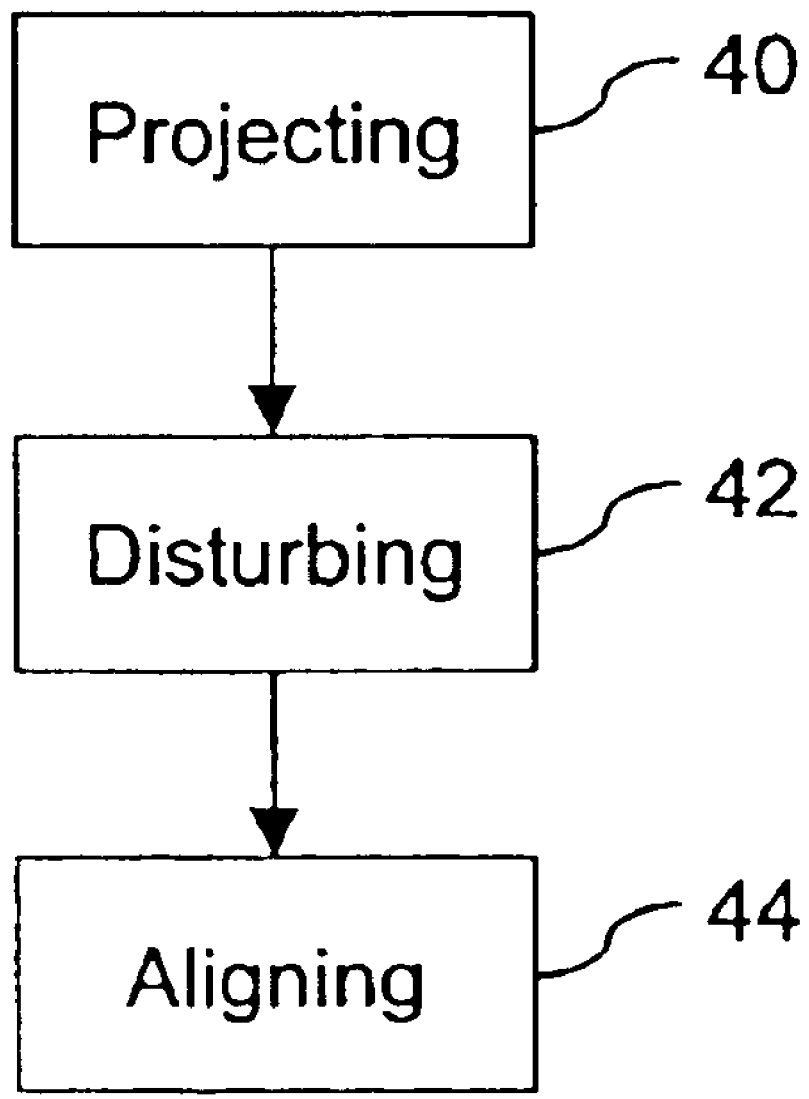
FIG. 3 is a flow chart illustrating one embodiment of the present invention method for reducing moiré.

FIG. 3 is a flow chart representing steps of one embodiment of the present invention. Although the steps represented in FIG. 2 are presented in a specific order, the present invention encompasses variations in the order of steps. Furthermore, additional steps may be executed between the steps illustrated in FIG. 3 without departing from the scope of the present invention.

A projector 4 projects 40 pixels 30 on back 26 of lenticular screen 6. A portion of projector 4 is disturbed 42 to cause displacement of the projection of pixels 30 on screen 6 to screen 6. Disturbing 42 optionally includes regulating the frequency, magnitude, or direction of the disturbance in order to reduce moiré.

Optionally, the pixel projection pitch is aligned 44 with the pitch of lenticular screen 6. In one embodiment, the pixel projection pitch is aligned 44 with the pitch of lenticular screen 6 dynamically and continuously to ensure the pixel projection pitch remains aligned 44 with the pitch of lenticular screen 6.

The foregoing description is only illustrative of the invention. Various alternatives and modifications can be devised by those skilled in the art without departing from the invention. Accordingly, the present invention embraces all such alternatives, modifications, and variances that fall within the scope of the appended claims.

What is claimed is:

1. A display with reduced moiré comprising:
   a lenticular screen;
   a projector configured to project a plurality of pixels onto the screen; and
   an actuator configured to cause displacement of the projection of the pixels to reduce moiré on the lenticular screen.

2. The display of claim 1 wherein the screen includes a front and a back and the projector is configured to project the plurality of pixels onto the back of the screen for display on the front of the screen.

3. The display of claim 1 wherein the screen includes a front and the projector is configured to project the plurality of pixels onto the front of the screen for display on the front of the screen.

4. The display of claim 1 wherein the projector includes a plurality of micro-mirrors configured to convey the plurality of pixels as an image onto the screen and the actuator includes a vibrator linked to at least one of the micro-mirrors.

5. The display of claim 1 wherein the projector includes a positioning mirror and the actuator includes a vibrator linked to the positioning mirror.

6. The display of claim 1 further including a frequency controller configured to regulate the actuator.

7. The display of claim 6 wherein the frequency controller is configured to regulate the actuator with an irregular frequency.

8. The display of claim 1 further including a magnitude controller configured to regulate the actuator.

9. The display of claim 8 wherein the magnitude controller is configured to regulate the actuator with an irregular magnitude.

10. The display of claim 1 further including a direction controller configured to regulate the actuator.

11. The display of claim 10 wherein the direction controller is configured to regulate the actuator with an irregular direction.

12. The display of claim 1 wherein the lenticular screen includes a pitch and further including a screen pitch sensor and a pixel projection pitch controller configured to align the pixel projection pitch with the pitch of the lenticular screen.

13. The display of claim 1 wherein the lenticular screen has a plurality of lenticules and the displacement of the projection is the size of less than one lenticule.

14. The display of claim 1 wherein the displacement of the projection is the size of less than one pixel.

15. A display with reduced moiré comprising:
   a lenticular screen;
   a projector configured to project a plurality of pixels onto the screen; and
   means for disturbing at least a portion of the projector to cause displacement of the projection of the pixels to reduce moiré on the lenticular screen.

16. The display of claim 15 wherein the screen includes a front and a back and the projector is configured to project the plurality of pixels onto the back of the screen for display on the front of the screen.

17. The display of claim 15 wherein the screen includes a front and the projector is configured to project the plurality of pixels onto the front of the screen for display on the front of the screen.

18. The display of claim 15 wherein the projector includes a plurality of micro-mirrors configured to convey the plurality of pixels as an image onto the screen and the means for disturbing includes means for vibrating at least one of the micro-mirrors.

19. The display of claim 15 wherein the projector includes a positioning mirror and the means for disturbing includes means for vibrating the positioning mirror.

20. The display of claim 15 further including means for regulating the frequency of the displacement.

21. The display of claim 20 wherein the means for regulating the frequency includes means for regulating the actuator with an irregular frequency.

22. The display of claim 15 further including means for regulating the magnitude of the displacement.

23. The display of claim 22 wherein the means for regulating the magnitude includes means for regulating the actuator with an irregular magnitude.

24. The display of claim 15 further including means for regulating the direction of the displacement.

25. The display of claim 24 wherein the means for regulating the direction includes means for regulating the actuator with an irregular direction.

26. The display of claim 15 wherein the lenticular screen includes a pitch and further including means for aligning the pixel projection pitch with the pitch of the lenticular screen.

27. The display of claim 15 wherein the lenticular screen has a plurality of lenticules and the displacement of the projection is the size of less than one lenticule.

28. The display of claim 15 wherein the displacement of the projection is the size of less than one pixel.

29. A method for reducing moiré comprising:
projecting a plurality of pixels onto a back of a lenticular screen; and
disturbing the projection to cause displacement of the pixels to reduce moiré.

30. The method of claim 29 further including regulating the frequency of the displacement.

31. The method of claim 30 wherein regulating the frequency includes regulating the displacement with an irregular frequency.

32. The method of claim 29 further including regulating the magnitude of the displacement.

33. The method of claim 32 wherein regulating the magnitude includes regulating the displacement with an irregular magnitude.

34. The method of claim 29 further including regulating the direction of the displacement.

35. The method of claim 34 wherein regulating the direction includes regulating the displacement with an irregular direction.

36. The method of claim 29 further including aligning the pixel projection pitch with a pitch of the lenticular screen.

37. The method of claim 36 wherein aligning further includes sensing the location of the pixel projection pitch and the pitch of the lenticular screen.

38. The method of claim 36 wherein aligning further includes directing the disturbing based on the location of the pixel projection pitch relative to the pitch of the lenticular screen.

39. A program storage system readable by a computer, tangibly embodying a program, applet, or instructions executable by the computer to perform method steps for reducing moiré, the method comprising:
projecting a plurality of pixels onto a lenticular screen; and
disturbing the projection to cause displacement of the pixels to reduce moiré.

40. The program storage system of claim 39 further including regulating the frequency of the displacement.

41. The program storage system of claim 40 wherein regulating the frequency includes regulating the displacement with an irregular frequency.

42. The program storage system of claim 39 further including regulating the magnitude of the displacement.

43. The program storage system of claim 42 wherein regulating the magnitude includes regulating the displacement with an irregular magnitude.

44. The program storage system of claim 39 further including regulating the direction of the displacement.

45. The program storage system of claim 44 wherein regulating the direction includes regulating the displacement with an irregular direction.

46. The program storage system of claim 39 wherein the lenticular screen has a pitch and the program storage system further includes aligning the pixel projection pitch with the pitch of the lenticular screen.

47. The program storage system of claim 46 wherein aligning further includes sensing the location of the pixel projection pitch and the pitch of the lenticular screen.

48. The program storage system of claim 46 wherein aligning further includes directing the disturbing based on the location of the pixel projection pitch relative to the pitch of the lenticular screen.

\* \* \* \* \*